(12) United States Patent
Stojiljkovic

(10) Patent No.: US 12,175,598 B2
(45) Date of Patent: *Dec. 24, 2024

(54) EFFICIENT GRAPHICAL ELEMENT TOP SURFACE RENDERING IN DIGITAL MAP

(71) Applicant: Mapbox, Inc., Washington, DC (US)

(72) Inventor: Aleksandar Stojiljkovic, Helsinki (FI)

(73) Assignee: MAPBOX, INC., Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,436

(22) Filed: Oct. 12, 2023

(65) Prior Publication Data

US 2024/0037850 A1 Feb. 1, 2024

Related U.S. Application Data

(63) Continuation of application No. 17/545,833, filed on Dec. 8, 2021, now Pat. No. 11,823,329.

(51) Int. Cl.
*G06T 17/05* (2011.01)
*G06F 16/29* (2019.01)
*G06T 1/20* (2006.01)

(52) U.S. Cl.
CPC .............. *G06T 17/05* (2013.01); *G06F 16/29* (2019.01); *G06T 1/20* (2013.01)

(58) Field of Classification Search
CPC ............ G06T 17/05; G06T 1/20; G06T 16/29
See application file for complete search history.

(56) References Cited

U.S. PATENT DOCUMENTS

| 9,443,494 B1 | 9/2016 | Parish et al. |
| 2007/0206016 A1* | 9/2007 | Szymanski ............. G06T 13/20 345/473 |
| 2011/0109719 A1* | 5/2011 | Wilson ..................... G06T 3/08 348/E13.001 |
| 2011/0316854 A1 | 12/2011 | Vandrovec |

(Continued)

OTHER PUBLICATIONS

Hwa, L. et al. "Real Time Optimal Adaptation for Planetary Geometry and Texture: 4-8 Tile Hierarchies," Transactions on Visualization and Computer Graphics, IEEE, vol. 11, No. 4, Jul.-Aug. 2005, pp. 355-368.

(Continued)

*Primary Examiner* — Sing-Wai Wu
*Assistant Examiner* — Khoa Vu
(74) *Attorney, Agent, or Firm* — FENWICK & WEST LLP

(57) ABSTRACT

A method or system for 3D rendering of map features on a client device. The client device receives a map tile and associated non-flat terrain data from a mapping server. The map tile represents a geographic area and features an object with a geometric base and height value. The terrain data gives elevation values for ground points. Using this data, the device's processors select a sample point on the map feature, determine its ground elevation, and calculate the feature's top surface elevation by adding the height value. Vertex ground elevations for the map tile's vertices are also determined, considering terrain variations. Vertex height values are calculated using these ground elevations and the top surface elevation. The map feature is then rendered in 3D, complete with vertical edges and a top surface, and displayed on the device's screen.

20 Claims, 9 Drawing Sheets

(56) References Cited

U.S. PATENT DOCUMENTS

| | | |
|---|---|---|
| 2012/0321129 A1 | 12/2012 | Mclaughlin et al. |
| 2013/0321392 A1 | 12/2013 | van der Merwe et al. |
| 2013/0321401 A1 | 12/2013 | Piemonte et al. |
| 2016/0292626 A1* | 10/2016 | Green .................... G06Q 50/02 |
| 2017/0039765 A1 | 2/2017 | Zhou et al. |
| 2020/0273150 A1 | 8/2020 | Burgett |
| 2020/0280951 A1 | 9/2020 | Tsuda et al. |

OTHER PUBLICATIONS

Larrick, G. et al. "Interactive Visualization of 3D Terrain Data Stored in the Cloud," Annual Ubiquitous Computing, Electronics & Mobile Communication Conference, IEEE, Oct. 28-31, 2020, pp. 63-70.

Zhang, Z. et al. "3D Terrain Reconstruction Based on Contours," Ninth International Conference on Computer Aided Design and Computer Graphics, IEEE, Dec. 7-10, 2005, pp. 1-6.

United States Office Action, U.S. Appl. No. 17/545,833, filed Jan. 25, 2023, 29 pages.

United States Office Action, U.S. Appl. No. 17/545,833, filed Oct. 6, 2022, 22 pages.

* cited by examiner

EFFICIENT GRAPHICAL ELEMENT TOP SURFACE RENDERING IN DIGITAL MAP

CROSS REFERENCE TO RELATED APPLICATIONS

This application is a continuation of co-pending U.S. application Ser. No. 17/545,833, filed Dec. 8, 2021, which is incorporated by reference in its entirety.

FIELD OF ART

This description relates to rendering digital maps, and particularly to generating rooftops on digital maps.

BACKGROUND

Digital maps are widely used today across myriad domains and for various purposes, from navigation, to ride sharing, to undergirding video games, among many others. While a standalone digital map computer program application may include data and processes requisite for its functional purpose, other digital map computer program applications expose functionality involving digital maps by communicating with a physically and/or logically separate mapping system (e.g., a digital map server), such as through employment of an Application Programming Interface (API) of the separate mapping system to access its data and/or processes.

Some conventional mapping systems render digital maps by stitching together map tiles each depicting a respective portion of a digital map. The conventional mapping system may include multiple sets of map tiles at a variety of "zoom levels," i.e., levels of granularity (e.g., a set of map tiles dividing the earth into sixty-four regions, and another set of map tiles dividing the earth into tens of thousands of regions), where the set of map tiles employed by the conventional mapping system for a given digital map depends upon a zoom level of the digital map (e.g., the extent of an area captured within a viewport of the digital map at a given time).

Each map tile is associated with a set of map features that may be digital representations of geographic features of the geographic region represented by the map tile, such as roads, bodies of water, public parks, buildings, or so on, as well as metadata corresponding to geographic features, such as textual labels, icons, symbols, or so on. The conventional mapping system can include graphical elements corresponding to map features that can be rendered in order to visually represent respective map features in a digital map.

Different map tiles at different zoom levels but representing the same geographic region may include different map features for the geographic region. For example, a first map tile representing 1,000 square miles may include as a map feature a label for a particular city at a particular geographic location, while a second map tile representing 10 square miles may include the label for the particular city at the particular geographic location, as well as a variety of map features representing roads, buildings, parks, and so on, each representing a geographic feature of the city.

The conventional mapping system loads a set of map tiles to use to generate a digital map, either from local storage, or by querying a separate mapping system. As the zoom level of the digital map changes (e.g., in response to user input), the conventional mapping system may responsively load map tiles corresponding to the new zoom level on the fly, and dynamically render newly loaded map tiles as they are loaded from local storage and/or received from a separate mapping system. Some conventional mapping systems wait until all map tiles are loaded, or alternatively a separate mapping system loads all relevant map tiles before sending them to the conventional mapping system, but this can lead to significant time delays that reduce the functionality of the digital map, especially for purposes that are time-sensitive, such as vehicle navigation or video game play.

Graphical elements representing map features may cumulatively include enough data that rendering them requires significant processing capabilities, and the rendering process may be slow enough that it negatively impacts the functionality of the digital map. Rendering three-dimensional graphical elements in particular can be computationally complex and expensive in terms of computing resources. For example, conventional techniques to generate a three-dimensional model of a building can involve calculating an elevation value for each point on the building's footprint, determining a building base elevation based on the elevation values, then drawing a roof a certain distance above the points of the building's footprint according to a height value of the map feature and the determined building base elevation. This and other techniques typically create a computational performance bottleneck due to the significant computing resources involved in executing such techniques for the (often expansive) set of buildings within the viewport of the digital map at any given time, which can change quickly in response to user manipulation of the viewport (e.g., scaling, panning, tilting, rotating, or other digital map operations), thus necessitating new roof computations and further exacerbating the problem.

Regardless of when, or from where, the conventional mapping system acquires map tiles to generate a digital map, additional problems arise with rendering graphical features falling on the border between two map tiles. This is especially true when computing the roof of a building that lay across two map tiles, in no small part due to the common situation where the conventional mapping system has not yet loaded all map tiles currently needed to render the digital map. As such, the conventional mapping system may not have the elevation values for a subset of the points on the building's footprint that are on an unloaded map tile. Also, the conventional mapping system may not have an association between two subsets of points of the same building that are on two different map tiles, and thus not have any indication that they belong to the same building and should be rendered together. Either case can lead to a miscalculation of the building base elevation, and/or lead to the conventional mapping system treating each subset of points of the building's footprint as separate buildings.

The conventional mapping system may use a first subset of points of the building's footprint on a first map tile to generate a first building base elevation and render a first rooftop based on the first building base elevation. The conventional mapping system then uses a second subset of points of the building's footprint from a second map tile to generate a second building base elevation and render a second rooftop based on the second building base elevation. If the first and second building base elevations are different, this can cause what should be rendered as one building graphical element to instead appear to be two different structures, with a roof that sharply changes in height at the map tile border. This not only doubles the computational load on the processor, but also creates an unrepresentative graphical element that does not accurately visualize the map feature. As such, improved systems for rendering digital maps are needed.

SUMMARY

According to one embodiment of a method, a client device receives, from a mapping server, a map tile representing a geographic region. The map tile is associated with a map feature having a geometric base and a height value, and the geometric base is represented by a set of vertices on the map tile. The client device also receives, from the mapping server, map terrain data including elevation values for points on the map tile. The client device determines whether all vertices of the map feature are in the set of vertices on the map tile.

The client device, responsive to determining all vertices of the map feature are in the set of vertices on the map tile, renders the map tile using its GPU, the rendering comprising the following steps. The GPU of the client device (and/or the CPU) selects a sample point on the map tile using the set of vertices. The GPU of the client device determines a sample elevation value for the sample point using the map terrain data. The GPU of the client device determines vertex elevation values for respective vertices in the set of vertices using the sample elevation value. The GPU of the client device renders the map tile with the map feature using the vertex elevation values. The map feature is rendered by the GPU of the client device in three dimensions with a top surface graphical component of a graphical element of the map feature having an elevation corresponding to a sum of the sample elevation value and the height value.

The client device displays the rendered map tile on an electronic display of the client device.

In this manner, the client device takes advantage of the GPU to reduce the computational expense in rendering graphical elements in a digital map. Rather than determining the elevation for each point within the geometric base of the map feature on the CPU, the client device utilizes the GPU to determine a base elevation based off one sample point (e.g., a center point), and an average slope (e.g., an average of respective slope values of vertices in the geometric base, as indicated by the terrain data). What's more, the technique does not require preparing information about building elevation beforehand, and enables asynchronous upload of split data (e.g., map feature data and terrain data) to the GPU where it is combined to generate the graphical element.

In an embodiment, the selected sample point corresponds to a center point of the geometric base of the map feature. In an embodiment, the client device receives the map tile and the terrain data asynchronously. In an embodiment, the map feature is a building, and the top surface graphical component represents a rooftop of the building. In an embodiment, the GPU is configured to render the map tile using a three-dimensional shader language.

In an embodiment, the GPU of the client device determining the vertex elevation values includes the following steps. The GPU of the client device determines, using the sample elevation value, an estimated slope for an area on the first map tile encompassed by the geometric base. For each vertex, the GPU of the client device determines a position of the vertex relative to the sample point corresponding to the sample elevation value and then a vertex elevation value for the base vertex based on a change in elevation from the sample point to the determined position of the base vertex according to the estimated slope.

In an embodiment, the client device, after rendering the map tile, receives updated map data including updates to one or more of the map tile, the map feature, or the map terrain data. The GPU of the client device determines an updated sample elevation value for an updated sample point of the set of sample points using the updated map data. The GPU of the client device determines updated vertex elevation values for the set of vertices using the updated sample elevation value. The GPU of the client device re-renders the map tile with the map feature using the updated vertex elevation values, wherein the map feature is rendered with the top surface graphical component having an elevation corresponding to a sum of the updated sample elevation value and the height value. The client device displays the re-rendered map tile on the electronic display of the client device.

In an embodiment, the client device determines whether all vertices of a second map feature are in a second set of vertices on a particular map tile. The client device, responsive to determining that not all vertices of the second map feature are in the second set of vertices, performs rooftop reconstruction for the second map feature. Responsive to performing rooftop reconstruction for the second map feature, the client device renders the map tile using the GPU.

In another embodiment, a non-transitory computer-readable storage medium stores instructions that, when executed by a computing device, executes one or more of the above-described methods.

In yet another embodiment, a computer system includes a processor and a non-transitory computer-readable storage medium that stores instructions for executing one or more of the above-described methods.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

I. System Environment

Figure 1:
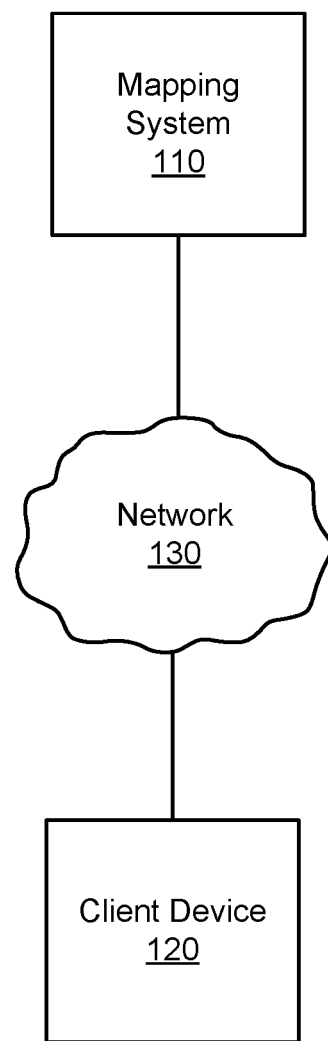
FIG. 1 illustrates a computer environment in which the techniques described may be practiced, according to one embodiment.

FIG. 1 illustrates a computer environment 100 in which the techniques described may be practiced, according to one embodiment. In the embodiment shown, the computing environment 100 includes a mapping system 110 that provides mapping services and a client device 120 that communicates with the mapping system 110 to receive map data via a network 130. In different embodiments, the computing environment 100 and its components may include different or additional elements than those illustrated in FIGS. 1-2. Furthermore, the functionality may be distributed among the elements in a different manner than described. The computer environment 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. The components of FIG. 1 are now described in more detail.

The mapping system 110 provides mapping services to client devices. In embodiments, the mapping system 110 provides map data to client devices for a variety of purposes, such as to display digital maps for purposes of navigation, ride sharing, or video games (e.g., a mixed reality game). In particular, the mapping system 110 provides the client device 120 with map tiles representing geographic regions, which can be used to render digital maps at various scales or resolutions, such as by stitching together a set of map tiles. For example, the client device 120 may send a request to the mapping system 110 for map tiles at a particular zoom level for a particular geographic region, and the mapping system 110 responds to the query by sending the client device 120 a respective set of map tiles, which is duly received by the client device 120.

Each map tile is associated with a set of map features that may be digital representations of geographic features of the geographic region represented by the map tile, such as roads, bodies of water, public parks, buildings, or so on, and/or may be metadata corresponding to geographic features, such as textual labels, icons, symbols, or so on. The map features of a map tile are rendered by the client device 120 using corresponding vector data. The vector data of a map tile includes geometric information representing the geographic features represented by the map features, such as points (e.g., vertices), lines (e.g., edges), and shapes (e.g., polygons), which may be associated with particular geographic coordinates and/or tile coordinates (e.g., coordinates indicating a position of the map feature within the map tile). For example, a map feature may be represented by a set of vertices and edges among those vertices that collectively describe the shape of a graphical element that visualizes the map feature. The set of vertices and edges may be divided into graphical components, such as a top surface graphical component (e.g., a roof).

The client device 120 processes the geographic information and labels of a map tile to render the map tile, which can be combined with other rendered map tiles to render an overall digital map. By rendering individual map tiles representing portions of an overall digital map, as opposed to rendering the entire digital map altogether, the client device 120 provides for efficient rendering of digital maps that can dynamically adapt to various scenarios (e.g., map scales).

The mapping system 110 may be comprised of any computing device, including but not limited to: servers, racks, workstations, personal computers, general purpose computers, laptops, Internet appliances, wireless devices, wired devices, multi-processor systems, mini-computers, virtual computing instances, and the like. Although FIG. 1 shows a single element, the mapping system 110 broadly represents one or multiple computing devices, such as a server cluster running a distributed computer program, where individual servers of the cluster may be located in one or more discrete physical locations.

The client device 120 communicates with the mapping system 110 in order to receive map data. The client device 120 may use the map data for a variety of purposes, such as rendering and displaying a digital map, or providing navigation services. In embodiments the client device 120 requests a set of map tiles from the mapping system 110 for rendering a digital map on a display of the client device 120. For instance, the client device 120 may request a set of map tiles for rendering a digital map representing a particular geographic region at one or more scales or resolutions. In this case, the client device 120 may receive the set of map tile from the mapping system 110 and stitch together the set of map tiles to render the digital map. As described in further detail below, stitching together the set of map tiles can involve determining graphical components of graphical elements constructed from vector data to visualize map features in the digital map. In particular, the client device 120 may determine top surface graphical components (e.g., rooftops) for graphical elements corresponding to map features that overlap multiple map tiles.

The client device 120 may be any suitable computing device, such as a laptop computer, hand-held computer, wearable computer, cellular or mobile phone, portable digital assistant (PDA), kiosk, or tablet computer. Although a single client device is depicted in FIG. 1, any number of client devices may be present. The client device 120 may include a GPS receiver that receives signals describing a geographic position of the client device 120 from GPS satellites (e.g., longitude and latitude). The client device 120 includes an electronic display on which digital maps may be presented.

In some embodiments, the client device 120 executes a client map application associated with mapping system 110, such as software that displays, uses, supports, or otherwise provides electronic mapping functionality as part of the application or software. The client map application may be configured for a variety of functions involving map data, such as navigation, transportation, augmented reality, product delivery, etc. In one embodiment, the client map application obtains electronic mapping functions through an integrated software development kit (SDK) or an application programming interface (API) associated with the mapping system 110. In this case, the SDK or API may implement functional calls, callbacks, methods or other programmatic means for contacting the server computer to obtain map tiles, map tile labels, layer data, digital elevation models, or other data useful to visually render a digital map as part of the application. As an example, the client map application may identify a set of map tiles needed to render a particular geographic region (e.g., defined by a set of geographic coordinates indicating a current or upcoming viewport of the digital map at the electronic display of the client device 120) and request corresponding map tiles and/or related data (e.g., terrain data such as digital elevation models) from the mapping system 110.

The network 130 connects the mapping system 110 and the client device 120. The network 130 may be any suitable communications network for data transmission. In an embodiment such as that illustrated in FIG. 1, the network 130 uses standard communications technologies or protocols and can include the internet. In another embodiment, the entities use custom or dedicated data communications technologies.

II. Exemplary Mapping Systems

Figure 2A:
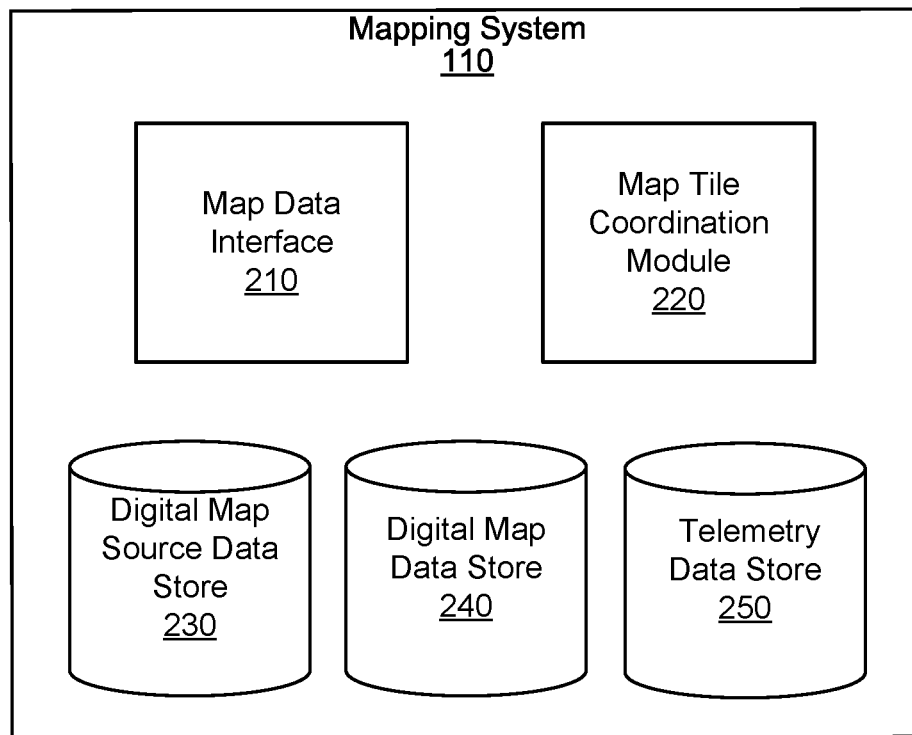
FIG. 2A is a block diagram illustrating a mapping system, according to one embodiment.

FIG. 2A is a block diagram illustrating a mapping system, according to one embodiment. In the embodiment shown, the mapping system 110 includes a map data interface 210 that communicates with external systems or devices (e.g., the client device 120) to provide mapping services and a map tile coordination module 220 that coordinates the retrieval of map data relevant to a request from the client device 120, e.g., a set of map tiles for display on the client device 120. The mapping system 110 further includes a digital map source data store 230 that stores raw digital map source data, a digital map data store 240 storing digital map data (e.g., derived from the digital map source data), and a telemetry data store 250 storing telemetry data. The components of FIG. 2 are now described in more detail.

The map data interface 210 provides map data services to one or more computing systems (e.g., the client device 120). In particular, the map data interface 210 receives requests for map data describing a geographic region, such as requests for a set of map tiles that can be used to render a digital map representing the geographic region at one or more scales or resolutions (e.g., by stitching together the set of map tiles). The map data interface 210 may request map tiles from the map tile coordination module 220 that correspond to the geographic region for a particular zoom level. Responsive to receiving the requested map tiles from the map tile coordination module 220, the map data interface 210 may provide the map tiles to the requesting system or device. The map data interface 210 may receive a request for map data from various sources, such as another component of the mapping system 110 or from a map application on the client device 120. The map data interface 210 may provide various interfaces to facilitate communication between the mapping system 110 and other computing systems, such as user interfaces, application programming interfaces (APIs), Software Development Kits (SDKs), and/or any other suitable interface.

The map tile coordination module 220 interfaces with the digital map source data store 230, digital map data store 240, and telemetry data store 250 to retrieve data relevant to a data request, e.g., a request from a client device 120 ingested by the map data interface 210 and translated into a request to the map tile coordination module 220. The map tile coordination module 220 retrieves the requested data from one or more data stores. For example, the map tile coordination module 220 generates one or more database queries and sends the database queries to one or more respective data stores, such as the digital map source data store 230, the digital map data store 240, or the telemetry data store 250, depending upon the embodiment. The map tile coordination module 220 receives data from one or more data stores in response to the one or more database queries. The map tile coordination module 220 sends the data to the map data interface 210 for propagation to the client device 120.

The digital map source data store 230 stores raw digital map data that is obtained, downloaded or received from a variety of sources. The raw digital map data may include satellite images, digital street data, building data, place data or terrain data. Example sources include National Aeronautics and Space Administration (NASA), United States Geological Survey (USGS), and DigitalGlobe. The digital map source data store 230 may be updated at any suitable interval, and may be stored for any amount of time. Once obtained or received, raw digital map source data stored in the digital map source data store 230 can be used by the mapping system 110 to generate digital map data (e.g., stored in the digital map data store 240).

The digital map data store 240 stores digital map data including map tiles. The digital map data may be derived from digital map source data, e.g., stored in the digital map source data store 230. In embodiments, the mapping system 110 processes and organizes digital map source data as a plurality of map tiles with corresponding sets of map labels or other style data used to impose different display styles for rendering the map tiles. Digital map data stored in the digital map data store 240 may be updated at any suitable interval, and may include additional information beyond that derived from digital map source data in the data store 230. For example, using aggregated telemetry data stored in the telemetry data store 250, discussed below, various additional information may be stored in association with the map tiles, such as traffic patterns, turn restrictions, detours, common or popular routes, speed limits, new streets, and any other information related to digital maps or the use of digital maps.

The telemetry data store 250 stores digital telemetry data that is obtained or received from mobile computing devices via function calls that are included in a Software Development Kit (SDK) that application developers use to integrate and include electronic maps in applications. The telemetry data may include mobile device location information based on GPS signals. For example, telemetry data may comprise one or more digitally stored events, in which each event comprises a plurality of event attribute values. Telemetry events may include: session start, map load, map pan, map zoom, map tilt or rotate, location report, speed and heading report, or a visit event including dwell time plus location. Telemetry event attributes may include latitude-longitude values for the then-current position of the mobile device, a session identifier, instance identifier, application identifier, device data, connectivity data, view data, and/or timestamp. The telemetry data store 250 may store aggregated telemetry data that has been processed using user privacy-preserving operations such as anonymization or chunking, data-cleaning operations such as filtering, or a combination thereof. Anonymization may include removing any data that identifies a specific mobile device or person. Chunking may include segmenting a continuous set of related telemetry data into different segments or chunks representing portions of travel along a route. For example, telemetry data may be collected during a drive from John's house to John's office. Chunking may break that continuous set of telemetry data into multiple chunks so that, rather than consisting of one continuous trace, John's trip may be stored as a trip from John's house to point A, a separate trip from point A to point B, and another separate trip from point B to John's office. Chunking may also remove or obscure start points, end points, or otherwise break telemetry data into any size. Filtering may remove inconsistent or irregular data, delete traces or trips that lack sufficient data points, or exclude any type or portion of data for any reason. Once processed, aggregated telemetry data can be stored in association with one or more map tiles, e.g., stored in the digital map data store 240. Aggregated telemetry data may be stored for any amount of time, such as a day, a week, or more. Aggregated telemetry data may be further processed or used by various applications or functions as needed.

The data stores 230, 240, or 250 may span multiple devices located in one or more physical locations. For example, the data stores 230, 240, or 250 may include one or more nodes located at one or more data warehouses.

Furthermore, although the data stores 230, 240, and 250 are depicted in FIG. 1 as components of the mapping system 110, the data stores 230, 240, or 250 may be located on a separate device or devices from the mapping system 110.

Figure 2B:
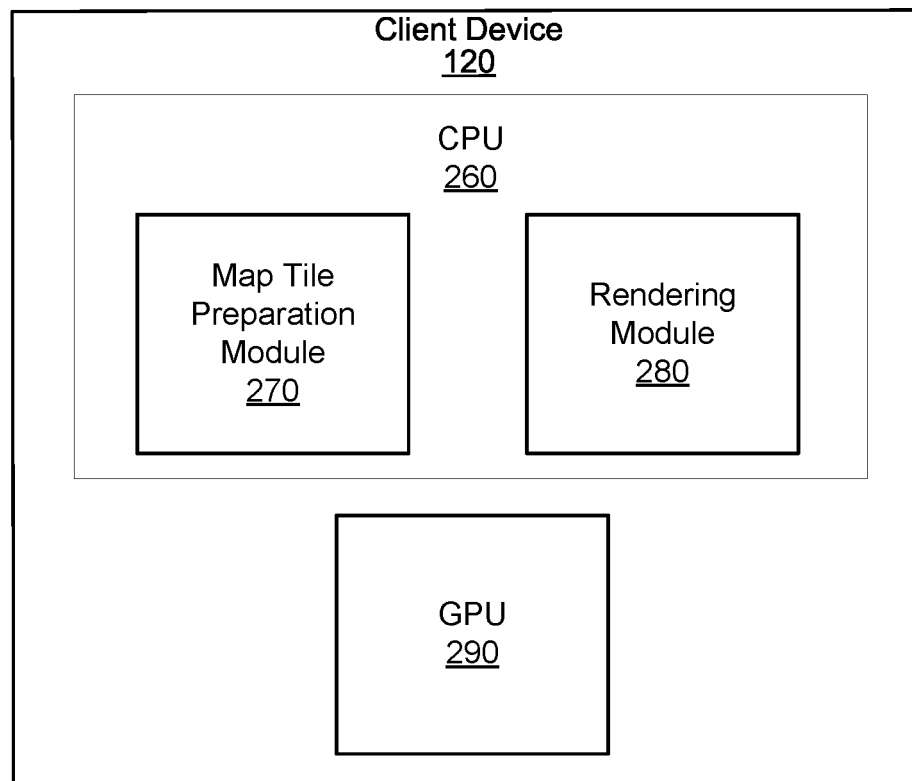
FIG. 2B is a block diagram illustrating a client device, according to one embodiment.

FIG. 2B is a block diagram illustrating a client device 120, according to one embodiment. The client device 120 includes a central processing unit (CPU) 260, and in various embodiments includes a graphical processing unit (GPU) 290. In the embodiment shown, the client device 120 includes a map tile preparation module 270 that communicates with external systems or devices (e.g., the mapping system 110) to request and receive map data, such as map tiles, terrain data, navigation instructions, and/or other data related to digital maps. The client device 120 further includes a rendering module 280 that uses map data received from the mapping system 110 and/or retrieved from local storage (not illustrated). In an embodiment, the client device 120 stores map data locally on the client device 120, e.g., some or all map data received from the mapping system 110. Depending upon the embodiment, some or all processes of the map tile preparation module 270 and/or rendering module 280 may be performed solely by the CPU 260. However, in some embodiments, the client device 120 performs functionality of the rendering module 280 using the GPU 290, as further detailed below.

The rendering module 280 performs rooftop reconstruction, which is a technique to generate a top surface graphical component of a graphical element visualizing a map feature in cases where the map feature overlaps multiple map tiles. Using rooftop reconstruction, the rendering module 280 enables the client device 120 to reduce the computational expense of rendering the digital map, while simultaneously resolving rendering problems where two partial top surface graphical components with different elevations are generated for the map feature, thus visualizing the map feature with an unrealistic roof.

A situation where the map feature may be rendered as two separate partial buildings, for example, is when the first map tile is rendered, and then the second map tile is received and then rendered. As the data of the second map tile was not present when the first map tile was rendered, the rendering module 280 did not have indication of vertices of the map feature within the second map tile. (In such a case, as detailed below, a rendering module 280 employing rooftop reconstruction techniques would regenerate a singular top surface graphical component for the building upon loading the second map tile). As a second example, the map tiles may not include data indicating correspondence between two or more sets of vertices in different map tiles that collectively form the geometric base of one building. (This is generally the case, as including such identifiers in practice significantly increases the size of the data, increasing the network bandwidth needed to transmit it, as well as the computational resources needed to store it and employ it).

The rendering module 280 receives a set of map tiles including a first map tile and a second map tile, as well as map terrain data, from the mapping system 110 (e.g., by way of the map tile preparation module 270). Depending upon the embodiment, the rendering module 280 may receive one or more map tiles and/or the map terrain data separately or together, synchronously or asynchronously. Each of the first and second map tiles represents a different portion of a geographic region (i.e., a different area segment of geographic space) than the other. The first map tile includes a map feature with a geometric base and a height value. The geometric base is a set of vertices and a set of edges representing a shape of the map feature. Each vertex in the set of vertices has a coordinate location within the first map tile. Each edge in the set of edges connects two vertices in the set of vertices. The height value indicates a height of a top surface graphical component of the map feature above the geometric base (e.g., a height of a roof above a building's floor).

One or more of the vertices in the set of vertices is located within the area represented by the first map tile. A separate one or more of the vertices in the set of vertices is located in the second map tile. As such, the map feature overlaps the first map tile and the second map tile. In particular, the map feature intersects a tile border between the first map feature and the second map feature. That is, one or more edges of the set of edges intersects the tile border by connecting a pair of vertices with one vertex in the first map tile and the other in the second map tile.

In an embodiment, the set of vertices is divided into a first subset of vertices in the first map tile and a second subset of vertices in the second map tile, and the rendering module 280 does not have data indicating the subsets collectively form one map feature's geometric base (e.g., the map tiles do not include map feature data indicating whether vertices of the map feature are on other map tiles). The rendering module 280 determines whether vertices on different map tiles belong to the same map feature (and thereby identify map features to which rooftop reconstruction applies) as follows. The rendering module 280 identifies map features on each map tile that terminate at the tile border. The rendering module 280 determines whether any identified map feature in the first map tile is within a threshold distance from an identified map feature in the second map tile (e.g., whether coordinates of one or more vertices of one identified map feature along the tile border are less than a threshold distance from coordinates of one or more vertices of another identified map feature along the tile border). If two identified map features (one on each map tile) are within the threshold distance, the rendering module 280 identifies them as matching. Responsive to determining that the first and second identified map features match, the rendering module 280 combines the vertices of each of the first and second identified map features (e.g., each subset of vertices) into one set of vertices for the map feature as a whole.

In an embodiment, if the client device 120 has received the first map tile but not the second map tile, and the client device 120 determines that one or more map features on the first map tile terminate at the tile border, the client device 120 does not render the one or more map features until the second map tile is received and the above process is performed.

In an embodiment, before evaluating each map tile of the first and second map tiles for map features intersecting the tile borders of the first and second map tiles, the rendering module 280 orders one or more map features of the first map tile that intersect the tile border according to respective points of intersection (e.g., in ascending or descending order). For example, a particular coordinate value may increase or decrease along the tile border. The rendering module 280 orders map features terminating in the tile border in order by the particular coordinate value. The rendering module 280 performs a similar operation for map features in the second map tile that terminate at the tile border. In this manner, the rendering module 280 makes the process of matching partial map features to one another more computationally efficient by lessening the number of comparisons that need be made between identified map features.

The map terrain data is data indicating elevation values at one or more points (e.g., coordinate locations) within the digital map, and corresponds to points on the map tiles. The map terrain data indicates a difference in elevation from a base elevation of the digital map (e.g., sea level). For example, a first point on the first map tile representing a particular geographic location within the geographic area represented by the first map tile may have an elevation value of 1,000 to represent that a ground level elevation of 1,000 feet above sea level is found at the particular geographic location (e.g., as a location upon a hillside). In some embodiments, elevation values can be negative, e.g., to indicate elevations that are below sea level. In an embodiment, the map terrain data is a digital elevation model, or a portion of a digital elevation model.

The rendering module 280 identifies the one or more edges of the geometric base that each connects two vertices of the set of vertices and intersects the tile border, as mentioned above. In an embodiment, the rendering module 280 identifies edges with end points (vertices) having respective coordinate locations in different map tiles. This may be done by the rendering module 280, for example, by identifying, for each vertex in the set of vertices, a map tile within which the vertex is located, then determining, for each edge connected to the vertex, whether a corresponding vertex at the other end of the edge is within the same map tile. If not, the rendering module 280 identifies the edge as intersecting the tile border.

The rendering module 280 determines a set of sample points for the map feature based on the one or more edges that intersect the tile border. The set of sample points includes one or more candidate points that the rendering module 280 uses to determine a sample elevation value to treat as the elevation value of the map feature as a whole. Selection of sample points for the set of sample points can vary depending on the embodiment. In one embodiment, the rendering module 280 selects all vertices in the set of vertices as sample points. In a second embodiment, the rendering module 280 selects a randomized subset of vertices in the set of vertices as sample points.

Figure 4A:
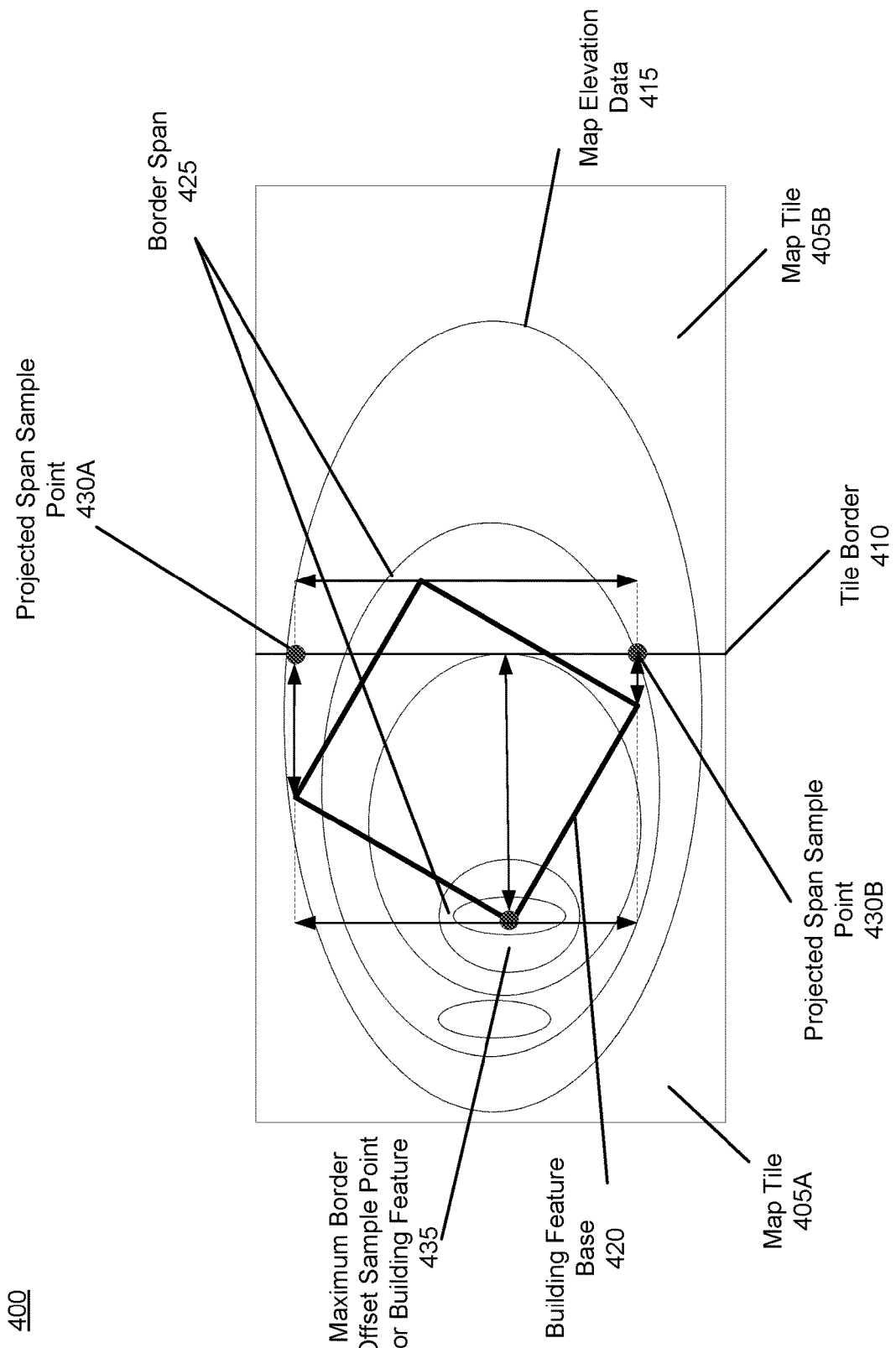
FIG. 4A illustrates a top-down topographic view of calculating a sample point for rooftop reconstruction in a digital map, according to an embodiment.

In a third embodiment, the rendering module 280 selects as sample points two projected span sample points, which is illustrated at FIG. 4A and described in further detail below. In this case, the rendering module 280 projects the edges of the map feature onto the tile border and identifies a span encompassing the projected edges. The endpoints of the span are the two projected span sample points. In an embodiment, the rendering module 280 only projects edges that intersect the tile border onto the tile border. Alternatively or additionally, the rendering module 280 identifies a vertex in the set of vertices that is a greatest distance (e.g., Euclidian distance) from the tile border, and selects the vertex as a sample point.

The rendering module 280 determines a sample elevation value for each sample point using the map terrain data. The rendering module 280 determines, for each sample point in the set of sample points, a respective coordinate location, then determines the elevation value in the map terrain data for the respective coordinate location as the sample elevation value for the sample point. The rendering module 280 then selects a particular sample elevation value from the determined sample elevation values. The selected particular sample elevation value is used by the rendering module 280 as a baseline elevation value for the map feature as a whole, e.g., as the elevation from which to determine a height of the top surface graphical element, as detailed below. In an embodiment, the rendering module 280 selects as the particular sample elevation value the sample elevation value with the maximum value. For example, if one sample point has an elevation value of −15, a second sample point has an elevation value of 10, and a third sample point has an elevation value of 6, the rendering module 280 selects the second sample point as the particular sample point.

The rendering module 280 determines vertex elevation values for each vertex in the set of vertices based on the particular sample elevation value. For each vertex in the set of vertices, the rendering module 280 determines an elevation of the vertex. For example, the rendering module 280 identifies a respective coordinate location of each vertex, then determines the elevation value in the map terrain data for the respective coordinate location as the vertex elevation value for the vertex.

In an embodiment, as described further below with reference to FIG. 5, the rendering module 280 determines the vertex elevation values according to the following technique, which may be partially or wholly on the GPU 290. The rendering module 280 identifies a center point of the geometric base and a respective elevation using the map terrain data. The rendering module 280 generates an estimated slope for the geometric base. For example, the rendering module 280 determines a slope for each edge that intersects the tile border (e.g., the elevation of the first vertex connecting an edge minus the elevation of the second vertex connecting the edge divided by a length of the edge). The rendering module 280 then averages each determined slope to generate the estimated slope. Based on the estimated slope and the center point, the rendering module 280 determines a building base elevation. For example, the rendering module 280 starts at the center point and uses the slope to calculate an elevation value estimate for a vertex that is furthest from the tile border. For example, if the center point is 5 distance units from the tile border and has an elevation value of 2, a most distant vertex is 10 distance units from the tile border, and the estimated slope is 1 elevation unit per distance unit, then the rendering module 280 generates an elevation value estimate of 7 for the most distant vertex, which is used as the particular sample point elevation for calculating vertex elevation values.

In an embodiment, the rendering module 280 determines sample elevation values, selects a particular sample elevation value, and/or determines vertex elevation values only responsive to receiving each of the first map tile, the second map tile, and the map terrain data. In such an embodiment, the rendering module 280 may not render map features overlapping both map tiles until both map tiles are received (e.g., the digital map will not include a partial building on one of the map tiles before the other is loaded). Alternatively, the rendering module 280 may render a partial graphical element for a map feature overlapping two map tiles, then re-render the full graphical element upon receipt of additional data (e.g., the other map tile). In an embodiment, the rendering module 280 waits until receiving both map tiles to render some graphical elements, but renders partial graphical elements for other graphical elements, depending upon the map features represented by the graphical elements. For example, based on user input received at the client device 120, or according to a style set by user input or received from the mapping system 110, the rendering module 280 renders partial graphical elements for map features of particular map feature categories (e.g., rivers), but waits for both map tiles for map features of different map feature categories (e.g., buildings).

The rendering module 280 renders the first and second map tiles with the map feature using the vertex elevation values, but basing an elevation of a top surface graphical component of a graphical element representing the map feature off the particular sample elevation value. The rendering module 280 determines an elevation of the top surface graphical component by adding the height value of the map feature to the particular sample elevation value. For example, if the map feature is a building with a height value of 30 feet, and the particular sample elevation value is 50 feet, the top surface graphical component is drawn by the rendering module 280 at an elevation of 80 feet from the baseline of the digital map. In an embodiment, the top surface graphical component is a flat surface with the same area as, and wholly overlapping, the geometric base of the map feature. In other embodiments, the map feature may include data specifying a particular shape of the top surface graphical component. In such embodiments, the rendering module 280 draws the vertical edges to the top surface graphical component based on the data.

The rendering module 280 renders one or more side surface graphical components of the graphical element representing the map feature using the elevation of the top surface graphical component and the vertex elevation values of one or more of the vertices in the set of vertices. For each of the one or more vertices, the rendering module 280 draws a vertical edge at the location of the vertex, from the vertex elevation value to the elevation of the top surface graphical component. For one or more polygons generated upon the rendering module 280 drawing the vertical edges, the rendering module 280 renders a side surface graphical component. In some embodiments, the map feature includes data specifying polygons for which to not generate a side surface (e.g., a three-sided alcove with an open face).

For example, a map feature may have a geometric base with three vertices. A first vertex has a vertex elevation value of 5, a second vertex has a vertex elevation value of 10, and a third vertex has a vertex elevation value of 15. The map feature has a height value of 20. The rendering module 280 determines a particular sample elevation value of 6. As such, the map feature has a top surface graphical component elevation of 26. The rendering module 280 draws a vertical edge at the first vertex from an elevation of 5 to an elevation of 26, at the second vertex from an elevation of 10 to an elevation of 26, and at the third vertex from an elevation of 15 to an elevation of 26. (Elevations may be or be based on, for example, a particular distance in map tile space, such as ¹⁄₆₄ of a map tile length, or a particular distance in geographic space, such as feet, meters, yards, etc.). The rendering module 280 generates three side surfaces, one between the first and second vertices, one between the second and third vertices, and one between the first and third vertices.

The rendering module 280 displays the graphical element generated in this manner on an electronic display of the client device 120. For example, the rendering module 280 generates the top surface graphical component and other graphical components of the graphical element for the map feature based on data of the map feature, then renders the graphical element as part of a digital map displayed at the electronic display (which includes some or all of the first map tile and the second map tile).

After rendering the digital map including the graphical element, the client device 120 may receive updated map data including updates to one or more of the first map tile, second map tile, map feature, and map terrain data. In such a situation, the rendering module 280 determines an updated sample elevation value for an updated sample point of the set of sample points using the updated map data, determines updated vertex elevation values for the set of vertices using the updated sample elevation value, and re-renders the digital map with the top surface graphical component having an elevation corresponding to a sum of the updated sample elevation value and the height value. The rendering module 280 displays the re-rendered digital map.

In an embodiment, upon determining the vertex elevation values, the rendering module 280 stores the vertex elevation values in a vertex shader of the GPU 290. The client device 120 uses the GPU 290 to render the map feature based off the stored vertex elevation values in the vertex shader by according to some or all of the techniques described herein with reference to the rendering module 280, which, depending upon the embodiment, may partially or wholly operate using the CPU 260.

If the rendering module 280 determines, for an additional map feature having an additional geometric base and an additional height value (the geometric base represented by an additional set of vertices), that the additional map feature resides entirely upon the first map tile, the rendering module 280 may employ efficient rooftop rendering as described below. The rendering module 280 may determine, using the map terrain data, an additional elevation value for a default point of the additional geometric base. The rendering module 280 may determine the default point as a center point of the geometric base, which may be a point of greatest distance from each vertex in the additional set of vertices.

The rendering module 280 may then determine additional vertex elevation values for the additional set of vertices using the additional sample elevation value and the additional height value and render the first map tile with the additional map feature using the additional vertex elevation values. The additional map feature may then be rendered by the rendering module 280 on the first map tile with an additional top surface graphical component having an elevation corresponding to a sum of the additional sample elevation value and the additional height value.

Although described herein with reference to determining a top surface graphical component, the techniques described can be applied to any alternative use cases where knowledge of full map feature geometry is needed and could change over time, such as highlighting selected map features, calculating the area of a map feature, or so on.

The rendering module 280 also performs efficient rooftop rendering in conjunction with the GPU 290. By performing an efficient rooftop rendering technique, the rendering module 280 avoids creating a computational bottleneck for the CPU 260 when rendering top surface graphical components, while simultaneously enabling asynchronous uploading of data to the GPU 290 for use in rendering the top surface graphical components (rather than requiring the gathering of all data before initiating a rendering process for a map feature).

The rendering module 280 receives from a mapping server a map tile representing a geographic region. The map tile is associated with a map feature having a geometric base and a height value, and the geometric base is represented by a set of vertices on the map tile. The rendering module 280 also receives map terrain data including elevation values for points on the map tile.

The rendering module 280 determines whether all vertices of the map feature are in the set of vertices on the map tile. If they are not, the rendering module 280 ends efficient rooftop rendering and schedules the map feature for rooftop reconstruction. If they are, then responsive to determining all vertices of the map feature are in the set of vertices on the map tile, the rendering module 280 renders the map tile using the GPU 290.

The rendering module 280 uses the GPU 290 and/or the CPU 260 to select a sample point on the map tile using the set of vertices. In particular, the rendering module 280 uses the GPU 290 to select as the sample point a center point of the geometric base of the map feature.

The rendering module 280 uses the GPU 290 to determine a sample elevation value for the sample point using the map terrain data. For example, the rendering module 280 uses the GPU 290 to determine a coordinate location of the sample point and retrieve an elevation value from the map terrain data for the coordinate location.

The rendering module 280 uses the GPU 290 to determine vertex elevation values for respective vertices in the set of vertices using the sample elevation value. In an embodiment, the rendering module 280 generates an estimated average slope of the map feature. This may involve determining the slope of one or more edges and averaging the slopes of the one or more edges, depending upon the embodiment. The rendering module 280 uses the estimated slope to generate a sample point elevation value for the sample point, and uses the sample point elevation value to determine the vertex elevation values.

In an embodiment, the GPU 290 determines, using the sample elevation value, an estimated slope for an area on the map tile encompassed by the geometric base. For each vertex, to determine its elevation value, the GPU 290 determines a position of the vertex relative to the sample point corresponding to the sample elevation value and then determines a vertex elevation value for the vertex based on a change in elevation from the sample point to the determined position of the vertex according to the estimated slope. In an embodiment, the GPU 290 is configured to render the map tile using a three-dimensional shader language.

The rendering module 280 uses the GPU 290 to render the map tile with the map feature using the vertex elevation values. The map feature is rendered in three dimensions with a top surface graphical component of a graphical element of the map feature having an elevation corresponding to a sum of the sample elevation value and the height value. The rendering module 280 displays the rendered map tile on an electronic display of the client device.

III. Rooftop Reconstruction Visualization

Figure 3:
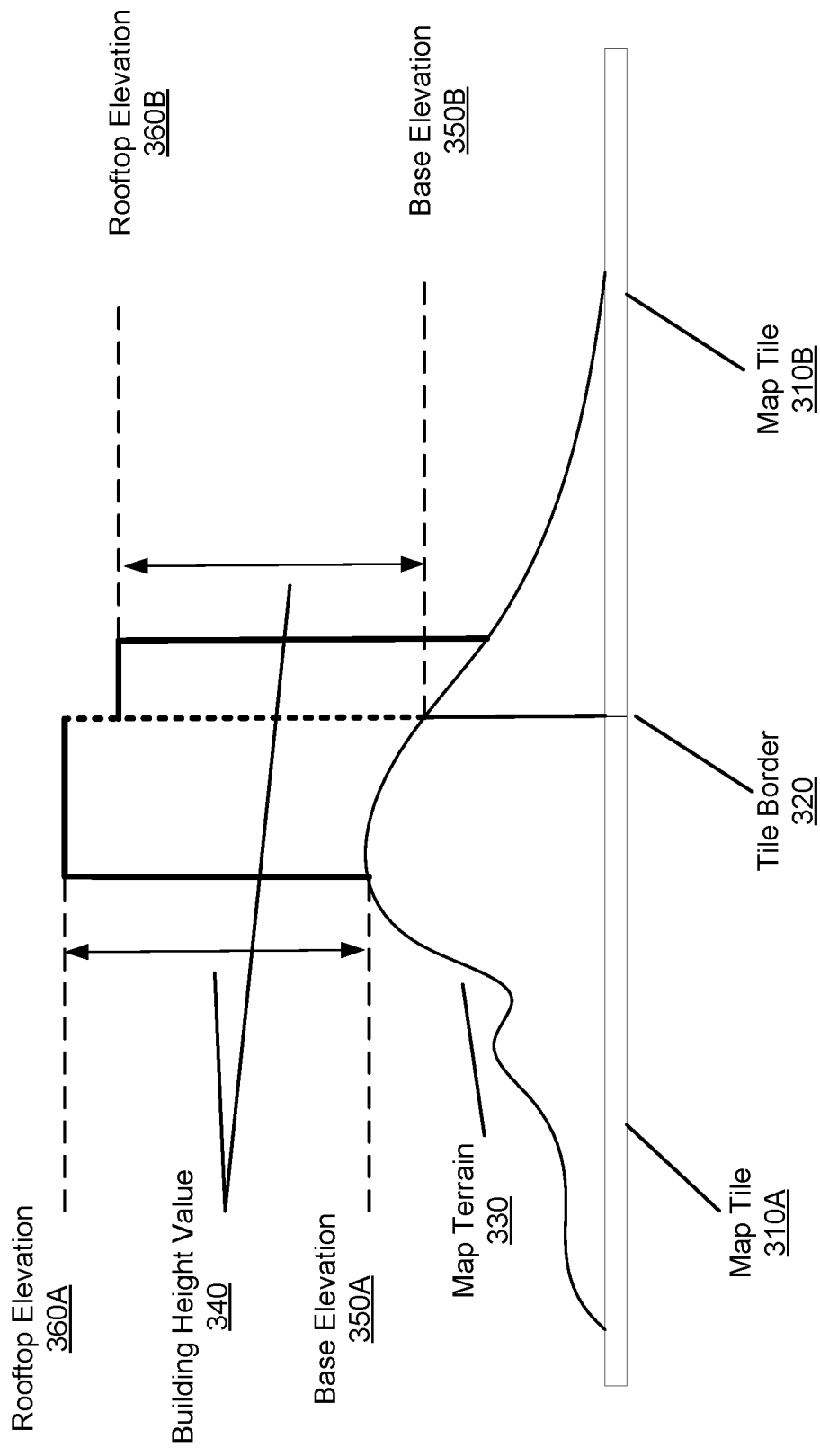
FIG. 3 illustrates a three-dimensional digital map including a building graphical element with a misaligned roof, according to an embodiment.

FIG. 3 illustrates a three-dimensional digital map 300 including a building graphical element with a misaligned roof, according to an embodiment. In particular, the figure is a side view of a portion of a rendered three-dimensional digital map 300 with graphical elements representing map features.

As described above, map features residing partially in multiple map tiles can lead to situations where the different portions of the map feature are rendered differently, e.g., with different top surface graphical component elevations, if not for the benefits of techniques of the present disclosure. The figure illustrates an embodiment of two partial building footprints rendered separately by the client device 120, and therefore with different top surface graphical components, as would occur if the rendering module 280 did not implement the techniques described herein to render the building.

In the embodiment of the figure, map tile 310A borders map tile 310B at tile border 320. The digital map 300 includes a map terrain 330 (e.g., terrain data such as a digital elevation model) that specifies elevation values for points on the map tiles 310. In particular, the map tiles 310 together represent a rolling hill with a building on top, with a descending slope of the hill intersecting the tile border 320 from the direction of map tile 310A to map tile 310B. As such, the elevations of points within the partial footprint of the building on map tile 310A are greater than the elevations of points within the partial footprint of the building on map tile 310B.

The rendering module 280 determines a base elevation 350 for each partial building footprint. Due to the elevation differences in each partial building footprint, the partial building footprint in map tile 310A leads to a respective base elevation 350A that is greater than base elevation 350B of the partial building footprint in map tile 310B. As such, when a building height value 340 of the building is added by the rendering module 280 to each base elevation 350 to determine a respective rooftop elevation 360 for each partial building, the resulting rooftop elevation 360A on map tile 310A is greater than the resulting rooftop elevation 360B on map tile 310B. As such, each partial building is rendered by the rendering module 280 with a different rooftop (at the respective rooftop elevation 360), leading to a graphical element representing the building that has an unrealistic roof at an incorrect height. Not only does the generated graphical element incorrectly visualize the map feature, but it involved rooftop elevation calculations for two partial building footprints, rather than one rooftop elevation calculation for one building footprint. As described herein, the digital map can be improved and its generation can be made less computationally expensive using rooftop reconstruction and efficient rooftop rendering techniques.

FIG. 4A illustrates a top-down topographic view of calculating a sample point for rooftop reconstruction in a digital map 400, according to an embodiment. The digital map 400 includes a map tile 405A and a map tile 405B that meet at tile border 410. The client device 120 has map terrain data for the tiles, which is visualized in the figure as topographic map elevation data 415. A building map feature's geometric base is illustrated as building feature base 420. The building feature base 420 is a square with four vertices and four edges among the vertices. The building's geometric base overlaps both map tiles 405, particularly at two edges that connect two vertices on the first map tile 405A to a vertex on the second map tile 405B.

The rendering module 280 determines three sample points for the map feature. For two of the three, the rendering module 280 projects the edges onto the tile border 410 and identifies a border span 425 for the map feature. The rendering module 280 identifies as two sample points the endpoints of the span of the projection of the building's edges onto the tile border 410—in other words, the projected span sample points 430. For the third sample point, the rendering module 280 identifies a vertex that is a maximum distance (e.g., offset in coordinate space) from the tile border 410. This maximum border offset sample point 435 for the building map feature is the third sample point.

Figure 4B:
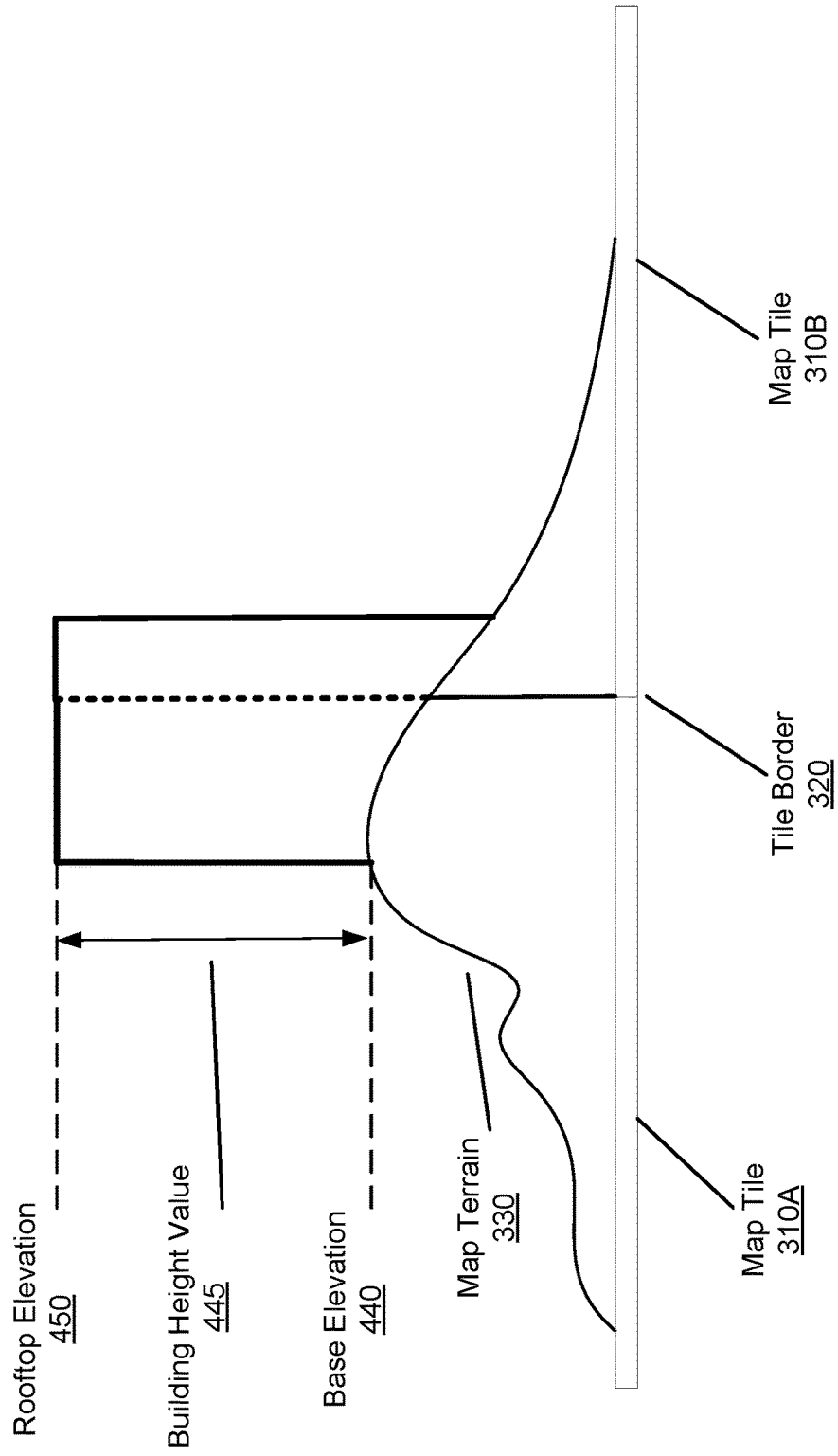
FIG. 4B illustrates a side view of rooftop reconstruction in a digital map, according to one embodiment.

FIG. 4B illustrates a side view of rooftop reconstruction in a digital map 460, according to one embodiment. The figure illustrates another embodiment of the rendered building and hill of FIG. 3, this time with the techniques described herein applied for rooftop reconstruction and efficient rooftop rendering. In contrast to the misaligned rooftop illustrated in FIG. 3, the rooftop in FIG. 4B accurately visualizes the roof of the building in relation to the terrain on which the building is situated. FIG. 4B includes the map tile 310A, map tile 310B, and tile border 320, along with the same map terrain 330.

Using rooftop reconstruction techniques, the rendering module 280 matches the partial building footprints and generates one base elevation 440 for the building footprint. The rendering module 280 adds the building height value 445 to the base elevation 440 to determine a rooftop elevation 450 for the building. The rendering module 280 generates a top surface graphical component for a graphical element representing the building, e.g., a roof, which is not disjointed at the tile border 320 and which is properly elevated above the map terrain 330.

IV. Efficient Graphical Element Rooftop Rendering Visualization

Figure 5:
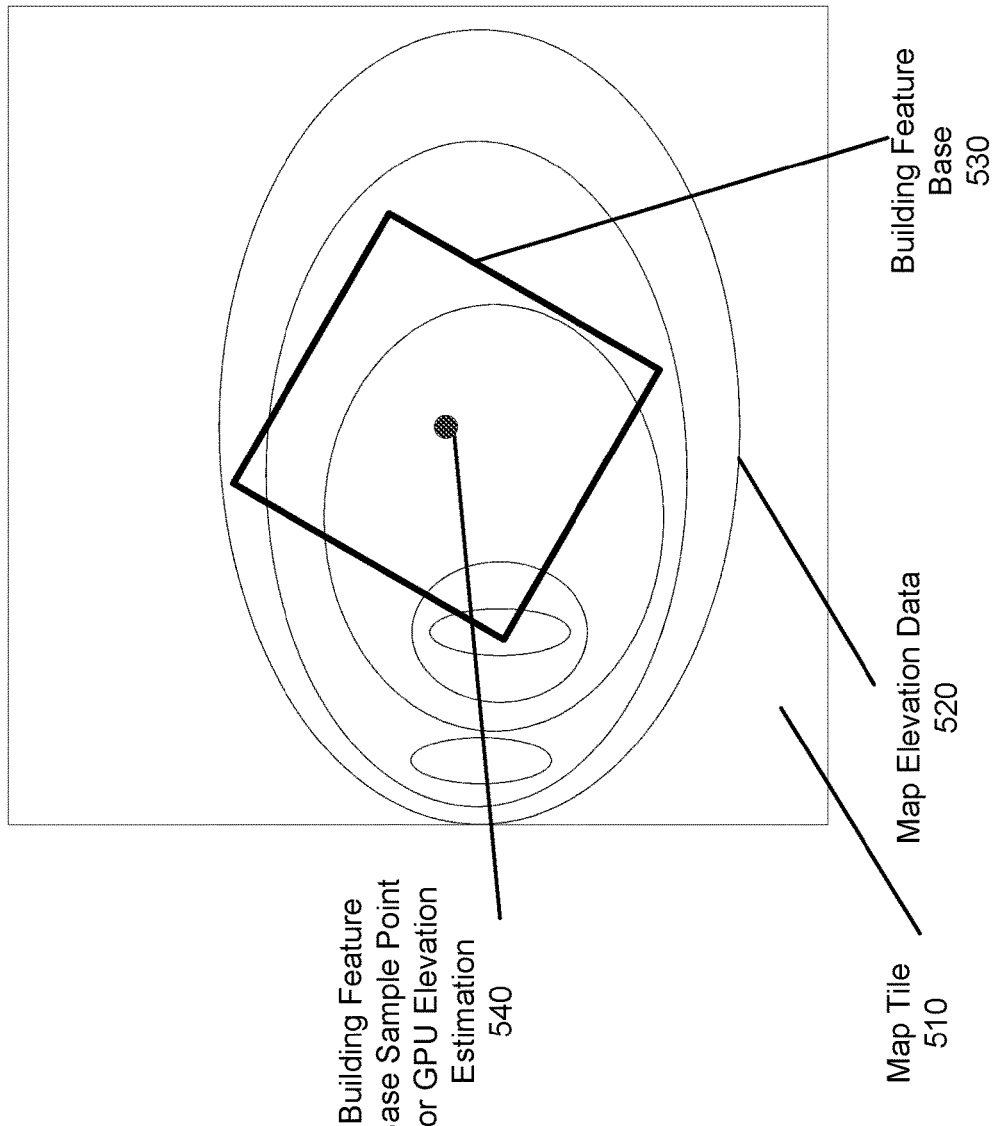
FIG. 5 illustrates a top-down topographic view of calculating a sample point for efficient rooftop rendering in a digital map, according to an embodiment.

FIG. 5 illustrates a top-down topographic view of calculating a sample point for efficient rooftop rendering in a digital map, according to an embodiment. A map tile 510 includes map elevation data 520, a topographic illustration of map terrain data. The map tile 510 also includes a building map feature with a building feature base 530, the geometric base of the building. The building feature base sample point for GPU elevation estimation (the center point 540 less specifically), is the center of the building.

The rendering module 280 uses the GPU 290 to determine the center point 540 (or, if the map feature includes an indication of the center point, fetches the center point) and uses the map elevation data 520 to determine an elevation of the center point 540. The GPU 290 estimates an average slope for the building. Using the estimated average slope and the center point 540, the rendering module 280 estimates an elevation of the base of the building from which to determine the top surface graphical component elevation (effectively, a particular sample elevation value).

V. Exemplary Processes

Figure 6:
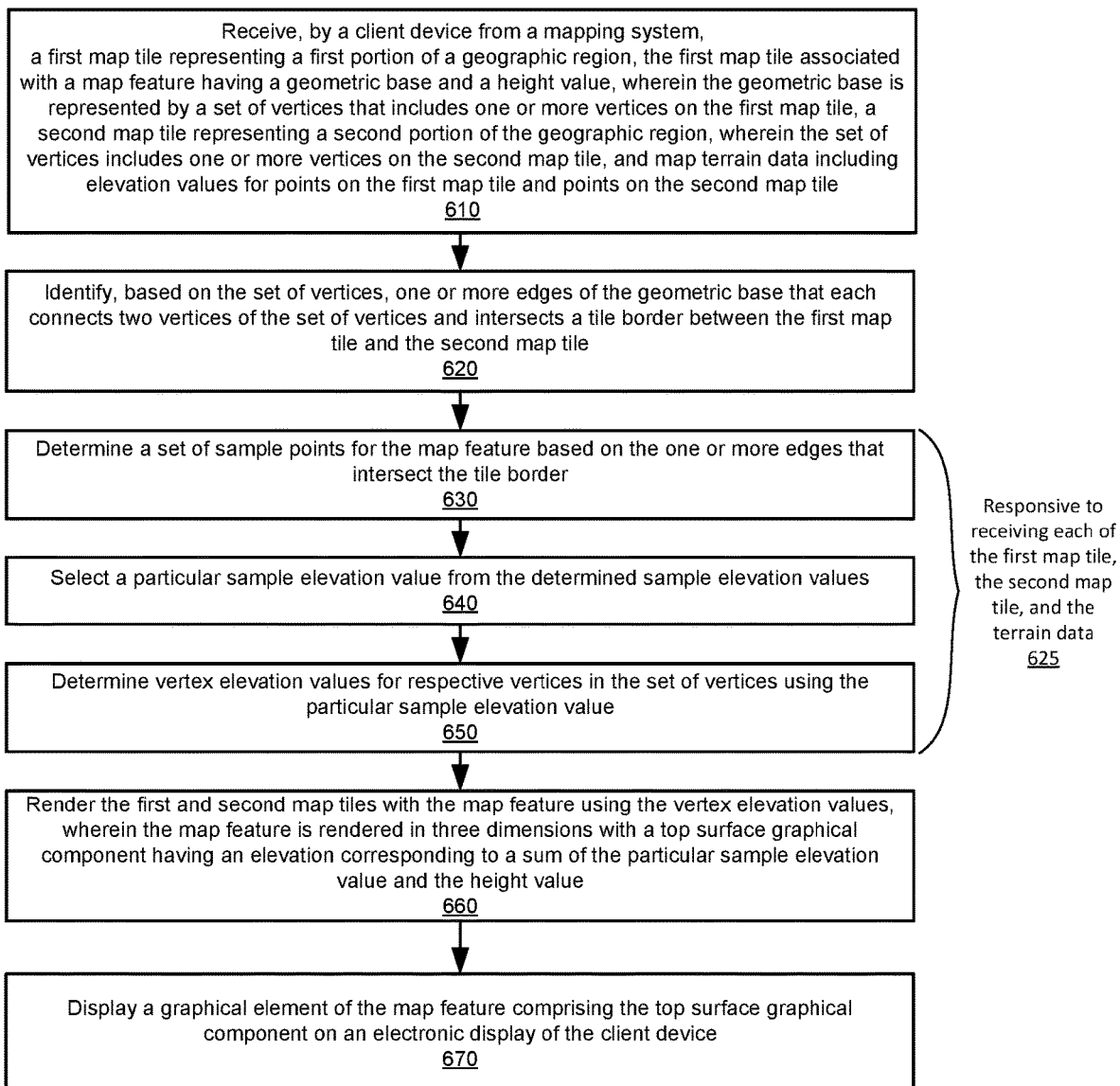
FIG. 6 is a flowchart illustrating a process for rooftop reconstruction, according to one embodiment.

FIG. 6 is a flowchart 600 illustrating a process for rooftop reconstruction, according to one embodiment. In the embodiment shown, the steps of FIG. 6 are illustrated from the perspective of the client device 120. In other embodiments, some or all of the steps may be performed by other entities or components, such as the mapping system 110. In addition, some embodiments may perform the steps in parallel, perform the steps in different orders, or perform different steps.

The client device 120 receives 610, from the mapping system 110, a first map tile representing a first portion of a geographic region. The first map tile is associated with a map feature that has a geometric base (e.g., footprint) and a height value. The geometric base is represented by a set of vertices that includes one or more vertices on the first map tile. The client device 120 also receives 610 a second map tile representing a second portion of the geographic region. The set of vertices includes one or more vertices on the second map tile. The client device 120 also receives 610 map terrain data including elevation values for points on the first map tile and points on the second map tile.

The client device 120 identifies 620, based on the set of vertices, one or more edges of the geometric base that each connects two vertices of the set of vertices and intersects a tile border between the first map tile and the second map tile. For example, the client device 120 identifies 620 an edge of the one or more edges with a first vertex in the first map tile and a second vertex in the second map tile by comparing coordinates of the first vertex and the second vertex to coordinates describing respective geographic areas represented by the first map tile and the second map tile. If the first vertex is within the geographic area represented by the first map tile and the second vertex is within the geographic area represented by the second map tile, the edge connecting the first vertex and the second vertex intersects the tile border.

Responsive to receiving each of the first map tile, the second map tile, and the terrain data 625, the client device 120 determines 630 a set of sample points for the map feature based on the one or more edges that intersect the tile border, selects 640 a particular sample elevation value from the determined sample elevation values, and determines 650 vertex elevation values for respective vertices in the set of vertices.

The client device 120 renders 660 the first map tile and the second map tile with the map feature using the vertex elevation values. The map feature is rendered by the client device 120 (e.g., in three dimensions) with a top surface graphical component having an elevation corresponding to a sum of the particular sample elevation value and the height value of the map feature.

The client device 120 displays 670 a graphical element of the map feature comprising the top surface graphical component on an electronic display of the client device. For example, if the map feature is a building, the client device 120 displays 670 a digital map including the building, as represented by a graphical element based on the geometric base and topped by the top surface graphical component at the elevation determined as a sum of the particular sample elevation value and height value.

In this manner, the client device 120 not only halves the computational load on the processor used to generate the top surface graphical component of the building, but also creates a more representative graphical element that more accurately visualizes the map feature within the digital map.

In an embodiment, the client device 120 determines the set of sample points by determining, based on the identified one or more edges, a border intersection span for the map feature, the border intersection span representing a projection of the one or more edges onto the border, and selecting one or more end points of the border intersection span for inclusion in the set of sample points.

In an embodiment, the client device 120 determines the set of sample points by determining a vertex of the set of vertices having a maximum distance from the border relative to the other vertices of the set of vertices and including the vertex as a sample point in the set of sample points.

In an embodiment, the client device 120 receives the one or more of the first map tile, the second map tile, and the terrain data asynchronously.

In an embodiment, the client device 120 determines the particular sample elevation value by selecting the maximum sample elevation value from the sample elevation values for the set of sample points.

In an embodiment, after rendering the first and second map tiles, the client device 120 receives updated map data including updates to one or more of the first map tile, the second map tile, the map feature, and the map terrain data. The client device 120 determines an updated sample elevation value for an updated sample point of the set of sample points using the updated map data. The client device 120 determining updated vertex elevation values for the set of vertices using the updated sample elevation value. The client device 120 re-renders the first and second map tiles with the map feature using the updated vertex elevation values. The map feature is rendered with the top surface graphical component having an elevation corresponding to a sum of the updated sample elevation value and the height value. The client device 120 displays the re-rendered first and second map tiles on the electronic display of the client device.

In an embodiment, the client device 120 determines the vertex elevation values by, responsive to receiving the map terrain data, evaluating each map tile of the first and second map tiles for map features intersecting the tile border of the first map tile and second map tile. This can involve the client device 120 identifying a first portion of the map feature on the first map tile intersecting the tile border between the first and second map tiles. The client device 120 then compares the first portion of the map feature to one or more map features of the second map tile. The one or more map features of the second map tile include a second portion of the map feature. The client device 120 then determines, based on the comparison, that that first portion of the map feature matches the second portion of the map feature of the second map tile. The client device 120, responsive to determining that the first and second portions match, determines the vertex elevation values for the set of vertices based on the matching first and second portions of the map feature. Depending upon the embodiment, this may further involve, in a case where the first map tile is received before the second map tile, and before receiving the second map tile, responsive to determining that one or more vertices of the set of vertices are not on the first map tile, rendering, by the client device 120, the first map tile without the map feature. Determining the vertex elevation values may, in an embodiment, involve, before evaluating each map tile of the first and second map tiles for map features intersecting the tile borders of the first and second map tiles, ordering, by the client device 120, one or more map features of the first map tile that intersect a first tile border of the first map tile according to a point of intersection of the one or map features on the first tile border. The client device 120 then orders one or more map features of the second map tile that intersect a second tile border of the second map tile according to a point of intersection of the one or map features on the second tile border.

In an embodiment, the client device 120 stores the vertex elevation values in a vertex shader, and the first and second map tiles are rendered with the map feature by the GPU 290 of the client device 120 using the vertex shader.

Figure 7:
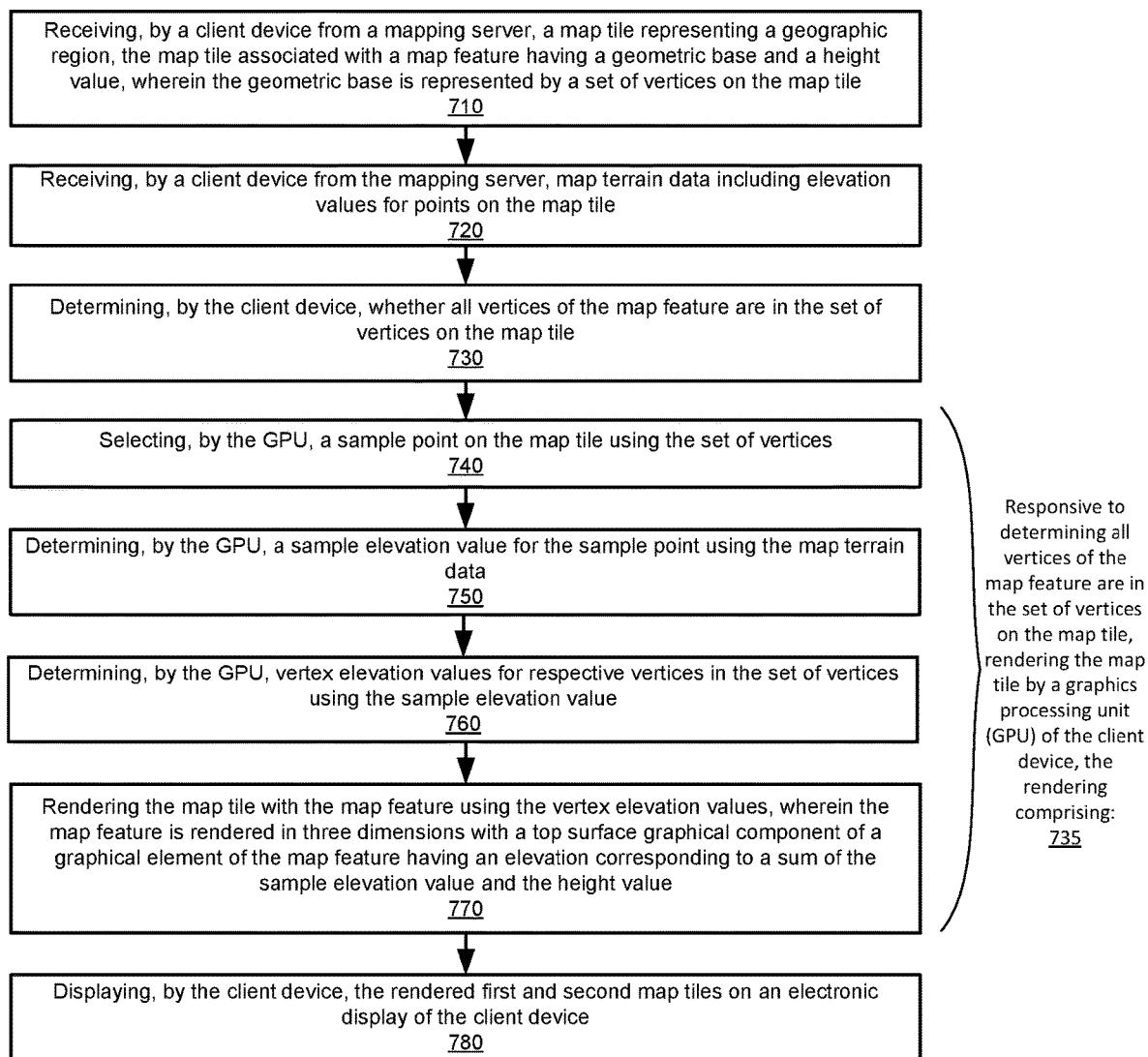
FIG. 7 is a flowchart illustrating a process for efficient rooftop rendering, according to one embodiment.

FIG. 7 is a flowchart 700 illustrating a process for efficient rooftop rendering, according to one embodiment. In the embodiment shown, the steps of FIG. 7 are illustrated from the perspective of the client device 120. In other embodiments, some or all of the steps may be performed by other entities or components, such as the mapping system 110. In addition, some embodiments may perform the steps in parallel, perform the steps in different orders, or perform different steps.

The client device 120 receives 710, from the mapping system 110, a map tile representing a geographic region. The map tile is associated with a map feature having a geometric base and a height value, and the geometric base is represented by a set of vertices on the map tile. The client device 120 also receives 720, from the mapping system 110, map terrain data including elevation values for points on the map tile. The client device 120 determines 730 whether all vertices of the map feature are in the set of vertices on the map tile.

The client device 120, responsive to determining all vertices of the map feature are in the set of vertices on the map tile, renders 735 the map tile using the GPU 290, the rendering 735 comprising the following steps. The GPU 290 of the client device 120 selects 740 a sample point on the map tile using the set of vertices. The GPU 290 of the client device 120 determines 750 a sample elevation value for the sample point using the map terrain data. The GPU 290 of the client device 120 determines 760 vertex elevation values for respective vertices in the set of vertices using the sample elevation value. The GPU 290 of the client device 120 renders 770 the map tile with the map feature using the vertex elevation values. The map feature is rendered by the GPU 290 of the client device 120 in three dimensions with a top surface graphical component of a graphical element of the map feature having an elevation corresponding to a sum of the sample elevation value and the height value.

The client device 120 displays 780 the rendered first and second map tiles on an electronic display of the client device 120.

In this manner, the client device 120 takes advantage of the GPU 290 to reduce the computational expense in rendering graphical elements in a digital map. Rather than determining the elevation for each point within the geometric base of the map feature on the CPU 260, the client device 120 utilizes the GPU 290 to determine a base elevation based off one sample point (e.g., a center point), and an average slope (e.g., an average of respective slope values of vertices in the geometric base, as indicated by the terrain data). What's more, the technique does not require preparing information about building elevation beforehand, and enables asynchronous upload of split data (e.g., map feature data and terrain data) to the GPU 290 where it is combined to generate the graphical element.

In an embodiment, the selected sample point corresponds to a center point of the geometric base of the map feature. In an embodiment, the client device receives the map tile and the terrain data asynchronously. In an embodiment, the map feature is a building, and the top surface graphical component represents a rooftop of the building. In an embodiment, the GPU is configured to render the map tile using a three-dimensional shader language.

In an embodiment, the GPU 290 of the client device 120 determining the vertex elevation values includes the following steps. The GPU 290 of the client device 120 determines, using the sample elevation value, an estimated slope for an area on the map tile encompassed by the geometric base. For each vertex, the GPU 290 of the client device 120 determines a position of the vertex relative to the sample point corresponding to the sample elevation value and then a vertex elevation value for the vertex based on a change in elevation from the sample point to the determined position of the vertex according to the estimated slope.

In an embodiment, the client device 120, after rendering the map tile, receives updated map data including updates to one or more of the map tile, the map feature, or the map terrain data. The GPU 290 of the client device 120 determines an updated sample elevation value for an updated sample point of the set of sample points using the updated map data. The GPU 290 of the client device 120 determines updated vertex elevation values for the set of vertices using the updated sample elevation value. The GPU 290 of the client device 120 re-renders the map tile with the map feature using the updated vertex elevation values, wherein the map feature is rendered with the top surface graphical component having an elevation corresponding to a sum of the updated sample elevation value and the height value. The client device 120 displays the re-rendered map tile on the electronic display of the client device 120.

In an embodiment, the client device 120 determines whether all vertices of a second map feature are in a second set of vertices on a particular map tile. The client device 120, responsive to determining that not all vertices of the second map feature are in the second set of vertices, performs rooftop reconstruction for the second map feature. Responsive to performing rooftop reconstruction for the second map feature, the client device 120 renders the map tile using the GPU 290.

VI. Computer Diagram

Figure 8:
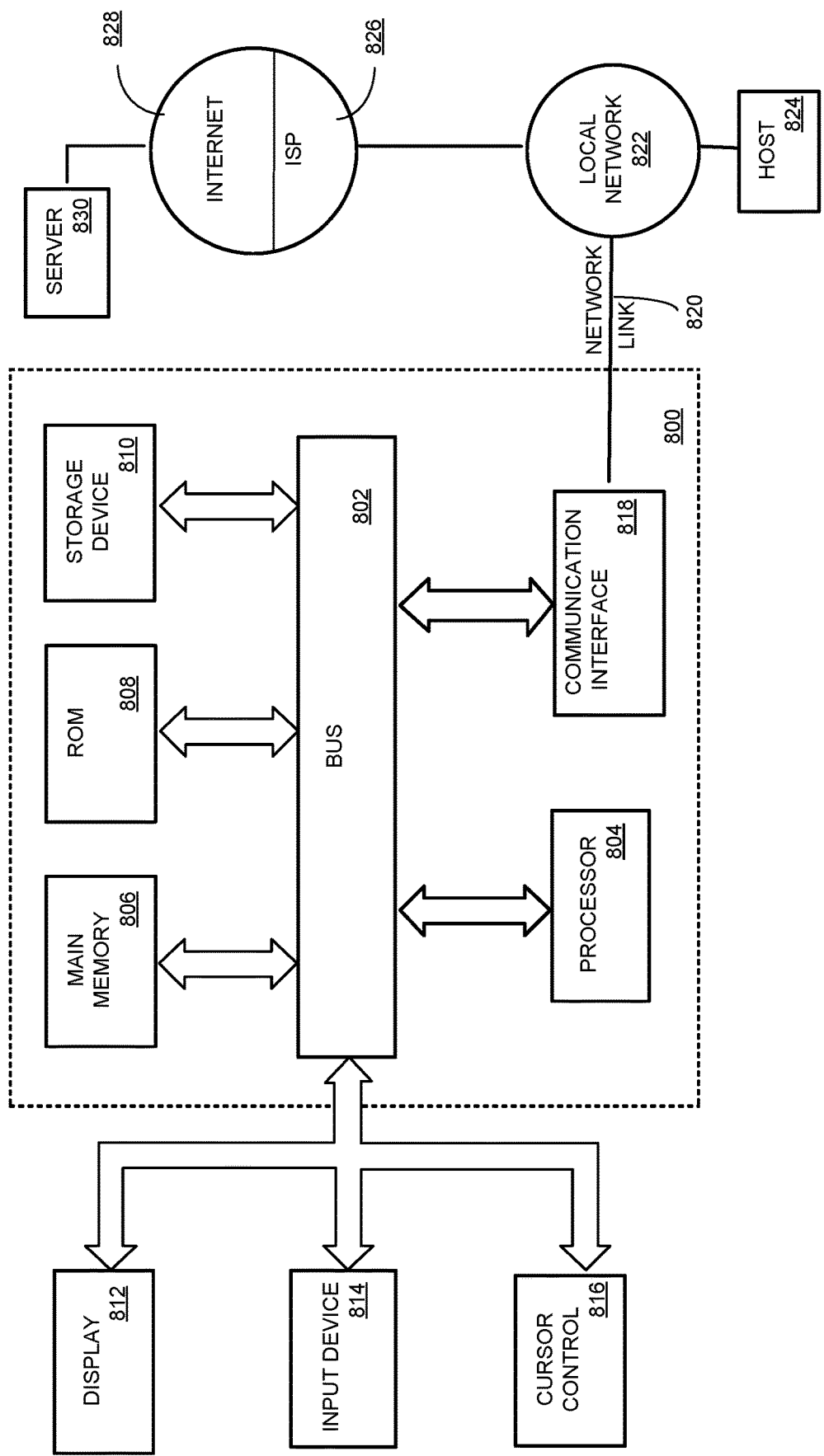
FIG. 8 is a block diagram that illustrates a computer system upon which embodiments of components of the computing environment depicted in FIG. 1 may be implemented, according to an embodiment.

FIG. 8 is a block diagram that illustrates a computer system 800 upon which embodiments of components of the computing environment 100 may be implemented. Computer system 800 includes a bus 802 or other communication mechanism for communicating information, and a hardware processor 804 coupled with bus 802 for processing information. Hardware processor 804 may be, for example, a general purpose microprocessor.

Example computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a LCD screen, LED screen, or touch screen, for displaying information to a computer user. An input device 814, which may include alphanumeric and other keys, buttons, a mouse, a touchscreen, or other input elements is coupled to bus 802 for communicating information and command selections to processor 804. In some embodiments, the computer system 800 may also include a cursor control 816, such as a mouse, a trackball, or cursor direction keys for communicating direction information and command selections to processor 804 and for controlling cursor movement on display 812. The cursor control 816 typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic, radio, or light waves, such as those generated during radio-wave and infra-red data communications, such as WI-FI, 3G, 4G, BLUETOOTH, or wireless communications following any other wireless networking standard.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and stored in storage device 810, or other non-volatile storage for later execution.

VII. Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

As used herein, any reference to "one embodiment" or "an embodiment" means that a particular element, label, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Where values are described as "approximate" or "substantially" (or their derivatives), such values should be construed as accurate+/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs that may be used to employ the described techniques and approaches. Thus, while particular embodiments and applications have been illustrated and described, it is to be understood that the described subject matter is not limited to the precise construction and components disclosed. The scope of protection should be limited only by the following claims.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, by a client device from a mapping server, a map tile representing a geographic region, the map tile associated with a map feature having a geometric base and a height value, wherein the geometric base is represented by a set of vertices on the map tile;
   receiving, by a client device from the mapping server, non-flat terrain data describing elevation values corresponding to ground points on the map tile;
   rendering the map tile by one or more processors of the client device, the rendering comprising:
      selecting a sample point on the map feature, wherein the sample point is a ground point within the geometric base represented by the set of vertices;
      determining, by the one or more processors, a sample ground elevation value of the sample point using the non-flat terrain data;
      determining a top surface elevation value of the map feature based on a sum of the sample ground elevation value and the height value;
      determining a set of vertex ground points corresponding to the set of vertices on the map tile;
      determining, by the one or more processors, vertex ground elevation values of the set of vertex ground points corresponding to the set of vertices using the non-flat terrain data, wherein at least one vertex ground elevation value is different from the sample ground elevation value due to non-flat terrain around the map feature;
      determining vertex height values of the set of vertices using the vertex ground elevation values and the top surface elevation value; and
      rendering the map tile with the map feature using the vertex ground elevation values, and the vertex height values, wherein the map feature is rendered in three dimensions with a top surface shown as a graphical element of the map feature having an elevation corresponding to a sum of the sample ground elevation value and the height value, and each vertex corresponding to a vertical edge of the map feature extending between the top surface and ground; and displaying, by the client device, the rendered map tile on an electronic display of the client device.

2. The method of claim 1, wherein the selected sample point corresponds to a center point of the geometric base of the map feature.

3. The method of claim 1, wherein the client device receives the map tile and the terrain data asynchronously.

4. The method of claim 1, wherein the map feature is a building, and wherein a top surface graphical component represents a rooftop of the building.

5. The method of claim 1, wherein determining the vertex elevation values comprises:
  determining, by the one or more processors, using the sample elevation value, an estimated slope for an area on the map tile encompassed by the geometric base; and
  for each vertex:
    determining, by the one or more processors, a position of the vertex relative to the sample point corresponding to the sample elevation value; and
    determining, by the one or more processors, a vertex elevation value for the vertex based on a change in elevation from the sample point to the determined position of the vertex according to the estimated slope.

6. The method of claim 1, further comprising:
  after rendering the map tile, receiving, by the client device, updated map data including updates to one or more of the map tile, the map feature, or the map terrain data;
  by the one or more processors:
    determining an updated sample elevation value for an updated sample point of the set of sample points using the updated map data;
    determining updated vertex elevation values for the set of vertices using the updated sample elevation value; and
    re-rendering the map tile with the map feature using the updated vertex elevation values, wherein the map feature is rendered with a top surface graphical component having an elevation corresponding to a sum of the updated sample elevation value and the height value; and
  displaying, by the client device, the re-rendered map tile on the electronic display of the client device.

7. The method of claim 1, wherein the one or more processors is configured to render the map tile using a three-dimensional shader language.

8. The method of claim 1, further comprising:
  determining, by the client device, whether all vertices of a second map feature are in a second set of vertices on a particular map tile;
  responsive to determining that not all vertices of the second map feature are in the second set of vertices, performing rooftop reconstruction for the second map feature; and
  responsive to performing rooftop reconstruction for the second map feature, rendering the map tile using the one or more processors.

9. A non-transitory computer readable storage medium having instructions encoded thereon that, when executed by one or more processors, cause the one or more processors to:
  receive, from a mapping server, a map tile representing a geographic region, the map tile associated with a map feature having a geometric base and a height value, wherein the geometric base is represented by a set of vertices on the map tile;
  receive, from the mapping server, non-flat terrain data describing elevation values corresponding to ground points on the map tile;
  render the map tile, the rendering comprising:
    selecting a sample point on the map feature, wherein the sample point is a ground point within the geometric base represented by the set of vertices;
    determining a sample ground elevation value of the sample point using the non-flat terrain data;
    determining a top surface elevation value of the map feature based on a sum of the sample ground elevation value and the height value;
    determining a set of vertex ground points corresponding to the set of vertices on the map tile;
    determining vertex ground elevation values of the set of vertex ground points corresponding to the set of vertices using the non-flat terrain data, wherein at least one vertex ground elevation value is different from the sample ground elevation value due to non-flat terrain around the map feature;
    determining vertex height values of the set of vertices using the vertex ground elevation values and the top surface elevation value; and
    rendering the map tile with the map feature using the vertex ground elevation values, and the vertex height values, wherein the map feature is rendered in three dimensions with a top surface shown as a graphical element of the map feature having an elevation corresponding to a sum of the sample ground elevation value and the height value, and each vertex corresponding to a vertical edge of the map feature extending between the top surface and ground; and
  display the rendered map tile on an electronic display.

10. The non-transitory computer readable storage medium of claim 9, wherein the selected sample point corresponds to a center point of the geometric base of the map feature.

11. The non-transitory computer readable storage medium of claim 9, wherein the one or more processors are configured to receive the map tile and the terrain data asynchronously.

12. The non-transitory computer readable storage medium of claim 9, wherein the map feature is a building, and wherein a top surface graphical component represents a rooftop of the building.

13. The non-transitory computer readable storage medium of claim 9, wherein determining the vertex elevation values comprises instructions to:
  determine, by the one or more processors, using the sample elevation value, an estimated slope for an area on the map tile encompassed by the geometric base; and
  for each vertex:
    determine, by the one or more processors, a position of the vertex relative to the sample point corresponding to the sample elevation value; and
    determine, by the one or more processors, a vertex elevation value for the vertex based on a change in elevation from the sample point to the determined position of the vertex according to the estimated slope.

14. The non-transitory computer readable storage medium of claim 9, the instructions further cause the one or more processors to:
  after rendering the map tile, receive updated map data including updates to one or more of the map tile, the map feature, or the map terrain data;
  determine an updated sample elevation value for an updated sample point of the set of sample points using the updated map data;
  determine updated vertex elevation values for the set of vertices using the updated sample elevation value; and
  re-render the map tile with the map feature using the updated vertex elevation values, wherein the map feature is rendered with a top surface graphical component having an elevation corresponding to a sum of the updated sample elevation value and the height value; and
  display the re-rendered map tile on the electronic display.

15. The non-transitory computer readable storage medium of claim 9, wherein the one or more processors are configured to render the map tile using a three-dimensional shader language.

16. The non-transitory computer readable storage medium of claim 9, the instructions further cause the one or more processors to:
  determine whether all vertices of a second map feature are in a second set of vertices on a particular map tile;
  responsive to determining that not all vertices of the second map feature are in the second set of vertices, perform rooftop reconstruction for the second map feature; and
  responsive to performing rooftop reconstruction for the second map feature, render the map tile.

17. A system, comprising:
  one or more processors; and
  a non-transitory computer-readable storage medium comprising instructions that, when executed by the one or more processors, cause the one or more processors to perform operations, the instructions comprising instructions to:
    receive, from a mapping server, a map tile representing a geographic region, the map tile associated with a map feature having a geometric base and a height value, wherein the geometric base is represented by a set of vertices on the map tile;
    receive, from the mapping server, non-flat terrain data describing elevation values corresponding to ground points on the map tile;
    render the map tile, the rendering comprising:
      selecting a sample point on the map feature, wherein the sample point is a ground point within the geometric base represented by the set of vertices;
      determining a sample ground elevation value of the sample point using the non-flat terrain data;
      determining a top surface elevation value of the map feature based on a sum of the sample ground elevation value and the height value;
      determining a set of vertex ground points corresponding to the set of vertices on the map tile;
      determining vertex ground elevation values of the set of vertex ground points corresponding to the set of vertices using the non-flat terrain data, wherein at least one vertex ground elevation value is different from the sample ground elevation value due to non-flat terrain around the map feature;
      determining vertex height values of the set of vertices using the vertex ground elevation values and the top surface elevation value; and
      rendering the map tile with the map feature using the vertex ground elevation values, and the vertex height values, wherein the map feature is rendered in three dimensions with a top surface shown as a graphical element of the map feature having an elevation corresponding to a sum of the sample ground elevation value and the height value, and each vertex corresponding to a vertical edge of the map feature extending between the top surface and ground; and
    display the rendered map tile on an electronic display.

18. The system of claim 17, wherein the selected sample point corresponds to a center point of the geometric base of the map feature.

19. The system of claim 17, wherein determining the vertex elevation values comprises instructions to:
  determine, by the one or more processors, using the sample elevation value, an estimated slope for an area on the map tile encompassed by the geometric base; and
  for each vertex:
    determine, by the one or more processors, a position of the vertex relative to the sample point corresponding to the sample elevation value; and
    determine, by the one or more processors, a vertex elevation value for the vertex based on a change in elevation from the sample point to the determined position of the vertex according to the estimated slope.

20. The system of claim 17, the instructions further cause the one or more processors to:
  determine, whether all vertices of a second map feature are in a second set of vertices on a particular map tile;
  responsive to determining that not all vertices of the second map feature are in the second set of vertices, perform rooftop reconstruction for the second map feature; and
  responsive to performing rooftop reconstruction for the second map feature, render the map tile.

* * * * *